United States Patent
Lou et al.

(10) Patent No.: US 9,350,616 B1
(45) Date of Patent: May 24, 2016

(54) BANDWIDTH PREDICTION USING A PAST AVAILABLE BANDWIDTH VALUE AND A SLOPE CALCULATED FROM PAST AVAILABLE BANDWIDTH VALUES

(75) Inventors: Ju-Chun Lou, Taoyuan (TW); Wen-Cheng Chang, Shetou Township (TW); Yen-Chiu Ku, Zhonghe (TW); Ren-Chien Chou, Yonghe (TW); Jui-Hao Lin, Xindian (TW)

(73) Assignee: Trend Micro Inc., Tokyo (JP)

( * ) Notice: Subject to any disclaimer, the term of this patent is extended or adjusted under 35 U.S.C. 154(b) by 858 days.

(21) Appl. No.: 12/777,688

(22) Filed: May 11, 2010

(51) Int. Cl.

| | |
|---|---|
| *G06F 15/173* | (2006.01) |
| *H04L 12/24* | (2006.01) |
| *H04L 12/26* | (2006.01) |
| *G06F 11/34* | (2006.01) |
| *H04W 28/02* | (2009.01) |
| *H04W 24/08* | (2009.01) |
| *H04L 12/911* | (2013.01) |
| *G06F 9/50* | (2006.01) |
| *H04W 40/18* | (2009.01) |
| *H04W 24/02* | (2009.01) |
| *H04L 12/801* | (2013.01) |
| *H04L 12/919* | (2013.01) |

(52) U.S. Cl.
CPC .......... *H04L 41/0896* (2013.01); *G06F 9/5072* (2013.01); *G06F 11/3409* (2013.01); *G06F 11/3442* (2013.01); *H04L 43/0805* (2013.01); *H04L 47/12* (2013.01); *H04L 47/823* (2013.01); *H04W 24/02* (2013.01); *H04W 24/08* (2013.01); *H04W 28/0289* (2013.01); *H04W 40/18* (2013.01); *H04L 43/0852* (2013.01); *H04L 43/16* (2013.01); *H04L 47/765* (2013.01)

(58) Field of Classification Search
CPC ..... H04W 24/02; H04W 40/18; H04W 24/08; H04W 28/0289; H04L 41/0896; H04L 43/0852; H04L 47/823; H04L 47/765; H04L 43/0805; H04L 47/12; H04L 43/16; G06F 9/5072; G06F 11/3409; G06F 11/3442
USPC .......................................................... 709/224
See application file for complete search history.

(56) References Cited

U.S. PATENT DOCUMENTS

| | | | | |
|---|---|---|---|---|
| 4,551,833 | A | * | 11/1985 | Turner .......................... 370/236 |
| 5,477,531 | A | * | 12/1995 | McKee et al. ................. 370/249 |
| 5,615,323 | A | * | 3/1997  | Engel et al. .................... 345/440 |

(Continued)

FOREIGN PATENT DOCUMENTS

WO    WO 92/22967    * 12/1992    .............. H04L 12/26

*Primary Examiner* — Daniel C Murray
(74) *Attorney, Agent, or Firm* — Beyer Law Group LLP (57) ABSTRACT

A software module on a client computer sends a query to a remote computer server operating a cloud service and receives a response, in order to determine latency. The latency is used with the total size of the packets sent and the packet size to determine the bandwidth available over the network connection at that time. Bandwidth available is calculated periodically and stored in a database of the client computer. Comparing a calculated bandwidth with predefined threshold values indicates whether the network status is good for initiating a cloud service with the computer server or poor. Any number of bandwidth available values are used to determine a slope and the slope is used to predict a bandwidth available value at a future time. A bandwidth available moving average is calculated by summing the bandwidth values for the previous days and dividing by the number of days; the moving average is calculated periodically.

9 Claims, 8 Drawing Sheets

(56) References Cited

U.S. PATENT DOCUMENTS

| | | | |
|---|---|---|---|
| 5,717,411 A * | 2/1998 | Knop et al. | 343/771 |
| 5,884,037 A * | 3/1999 | Aras et al. | 709/226 |
| 6,078,958 A * | 6/2000 | Echeita et al. | 709/226 |
| 6,208,640 B1 * | 3/2001 | Spell et al. | 370/358 |
| 6,249,530 B1 * | 6/2001 | Blanco et al. | 370/468 |
| 6,308,148 B1 * | 10/2001 | Bruins et al. | 703/27 |
| 6,320,585 B1 * | 11/2001 | Engel et al. | 345/440 |
| 6,320,846 B1 * | 11/2001 | Jamp et al. | 370/235 |
| 6,600,721 B2 * | 7/2003 | Edholm | 370/232 |
| 6,614,763 B1 * | 9/2003 | Kikuchi et al. | 370/252 |
| 6,738,348 B1 * | 5/2004 | Rollins | 370/230 |
| 6,842,733 B1 * | 1/2005 | Gao et al. | 704/224 |
| 6,850,884 B2 * | 2/2005 | Gao et al. | 704/224 |
| 6,937,979 B2 * | 8/2005 | Gao et al. | 704/230 |
| 6,996,626 B1 * | 2/2006 | Smith | 709/232 |
| 7,050,407 B1 * | 5/2006 | Frazer et al. | 370/329 |
| 7,519,011 B2 * | 4/2009 | Petrus et al. | 370/280 |
| 7,525,302 B2 * | 4/2009 | Miller | G01R 27/04 324/762.05 |
| 7,568,045 B1 * | 7/2009 | Agrawal | H04L 41/42 709/223 |
| 7,668,968 B1 * | 2/2010 | Smith | 370/234 |
| 7,675,856 B2 * | 3/2010 | Padmanabhan | H04L 12/2697 370/235 |
| 7,831,971 B2 * | 11/2010 | Berstis et al. | 718/102 |
| 7,839,861 B2 * | 11/2010 | Toomey | H04L 41/142 370/395.21 |
| 7,853,948 B2 * | 12/2010 | Berstis et al. | 718/102 |
| 7,873,074 B1 * | 1/2011 | Boland | 370/468 |
| 7,882,207 B1 * | 2/2011 | Titmuss et al. | 709/223 |
| 7,957,284 B2 * | 6/2011 | Lu et al. | 370/230 |
| 8,077,967 B2 * | 12/2011 | Brown | 382/167 |
| 8,095,933 B2 * | 1/2012 | Berstis et al. | 718/104 |
| 8,194,556 B2 * | 6/2012 | Tacconi et al. | 370/252 |
| 8,400,921 B2 * | 3/2013 | Grayson et al. | 370/232 |
| 8,705,359 B2 * | 4/2014 | Bou-Abboud | 370/234 |
| 2002/0049585 A1 * | 4/2002 | Gao et al. | 704/220 |
| 2002/0143527 A1 * | 10/2002 | Gao et al. | 704/223 |
| 2003/0067940 A1 * | 4/2003 | Edholm | 370/468 |
| 2004/0015582 A1 * | 1/2004 | Pruthi | 709/224 |
| 2005/0153697 A1 * | 7/2005 | Patel | 455/442 |
| 2005/0281278 A1 * | 12/2005 | Black et al. | 370/412 |
| 2006/0028999 A1 * | 2/2006 | Iakobashvili et al. | 370/252 |
| 2006/0170431 A1 * | 8/2006 | Miller | G01R 27/04 324/637 |
| 2006/0215574 A1 * | 9/2006 | Padmanabhan | H04L 12/2697 370/252 |
| 2007/0058547 A1 * | 3/2007 | Berstis | 370/232 |
| 2007/0076754 A1 * | 4/2007 | Krishnaswamy | 370/468 |
| 2007/0094002 A1 * | 4/2007 | Berstis et al. | 703/22 |
| 2007/0094662 A1 * | 4/2007 | Berstis et al. | 718/102 |
| 2007/0214483 A1 * | 9/2007 | Bou-Abboud | 725/96 |
| 2007/0298811 A1 * | 12/2007 | Hartman et al. | 455/452.2 |
| 2008/0025219 A1 * | 1/2008 | Chao et al. | 370/235 |
| 2008/0043745 A1 * | 2/2008 | Toomey | H04L 41/142 370/395.21 |
| 2008/0188228 A1 * | 8/2008 | Pecen et al. | 455/449 |
| 2008/0195748 A1 * | 8/2008 | Tierney et al. | 709/232 |
| 2008/0253325 A1 * | 10/2008 | Park et al. | 370/329 |
| 2008/0273591 A1 * | 11/2008 | Brooks et al. | 375/273.01 |
| 2009/0147737 A1 * | 6/2009 | Tacconi et al. | 370/329 |
| 2009/0212790 A1 * | 8/2009 | Miller | G01R 27/04 324/642 |
| 2009/0222555 A1 * | 9/2009 | Qian et al. | 709/224 |
| 2010/0027426 A1 * | 2/2010 | Nair et al. | 370/238 |
| 2012/0066366 A1 * | 3/2012 | Blaisdell | 709/223 |
| 2012/0089781 A1 * | 4/2012 | Ranade et al. | 711/118 |
| 2012/0108225 A1 * | 5/2012 | Luna et al. | 455/418 |
| 2012/0151056 A1 * | 6/2012 | Sporel et al. | 709/225 |
| 2012/0250762 A1 * | 10/2012 | Kaye et al. | 375/240.07 |
| 2015/0248610 A1 * | 9/2015 | Bou-Abboud | H04L 43/0876 706/11 |

* cited by examiner

FIG. 5
Bandwidth Thresholds

FIG. 6
Bandwidth Moving Average

BANDWIDTH PREDICTION USING A PAST AVAILABLE BANDWIDTH VALUE AND A SLOPE CALCULATED FROM PAST AVAILABLE BANDWIDTH VALUES

FIELD OF THE INVENTION

The present invention relates generally to communication over a network with a computer server. More specifically, the present invention relates to prediction of available bandwidth in the context of "in-the-cloud" services.

BACKGROUND OF THE INVENTION

Traditionally, application software for computers has followed an end-user centric model. In other words, in order to perform a particular application, an end user would purchase and install (or download and install) application software that would execute on the users computer. With the advent of the Internet, fast connections and powerful computer servers, it has been possible for various types of application software to now execute on remote Web server computers rather than on the end-user computer. The task to be performed at the end-user computer still occurs, but now there is an increase in data and information transmitted back and forth between the end-user computer and the Web server over a network connection or over the Internet.

In one example, the World Wide Web, and the Internet in general, is termed "the cloud," applications are referred to as being performed "in the cloud" and the application that executes on the Web server is termed an "in-the-cloud service" or a "cloud service." Client computers may now connect to a particular server computer (over a network connection or over the Internet) in order to have a service performed, and may also subscribe to such a service. Unfortunately, the increase in the use of such cloud services and the intensity of the data communications required can lead to problems. In one example, the client computer may be forced to disconnect from (or cannot connect to) a particular server computer while attempting to receive a particular service because of congestion on the computer network or because the computer server is busy. A disconnect is problematic because the network service recovery cost can be large in terms of time wasted, opportunity lost, time to reconnect, etc.

In general then, a potential problem with any cloud service is the lack of suitable bandwidth available for communication with the cloud server. In one specific example, malware scanning on a client computer makes use of a cloud service and can be affected by lack of suitable bandwidth. Historically, malware scanning identifies infected files on a client computer by comparing a hash value (or several hash values) of a suspect file with a list of hash values stored in a virus pattern file on the client computer. Pattern files can be quite large and are distributed regularly in order to provide protection against the latest threats. Currently, though, a new file reputation service decouples the pattern file from the local virus scan engine and conducts pattern file lookups over a network to a scan server in the cloud (or to a scan server located within a local or wide-area network). The pattern file is thus located on the scan server.

Figure 1:
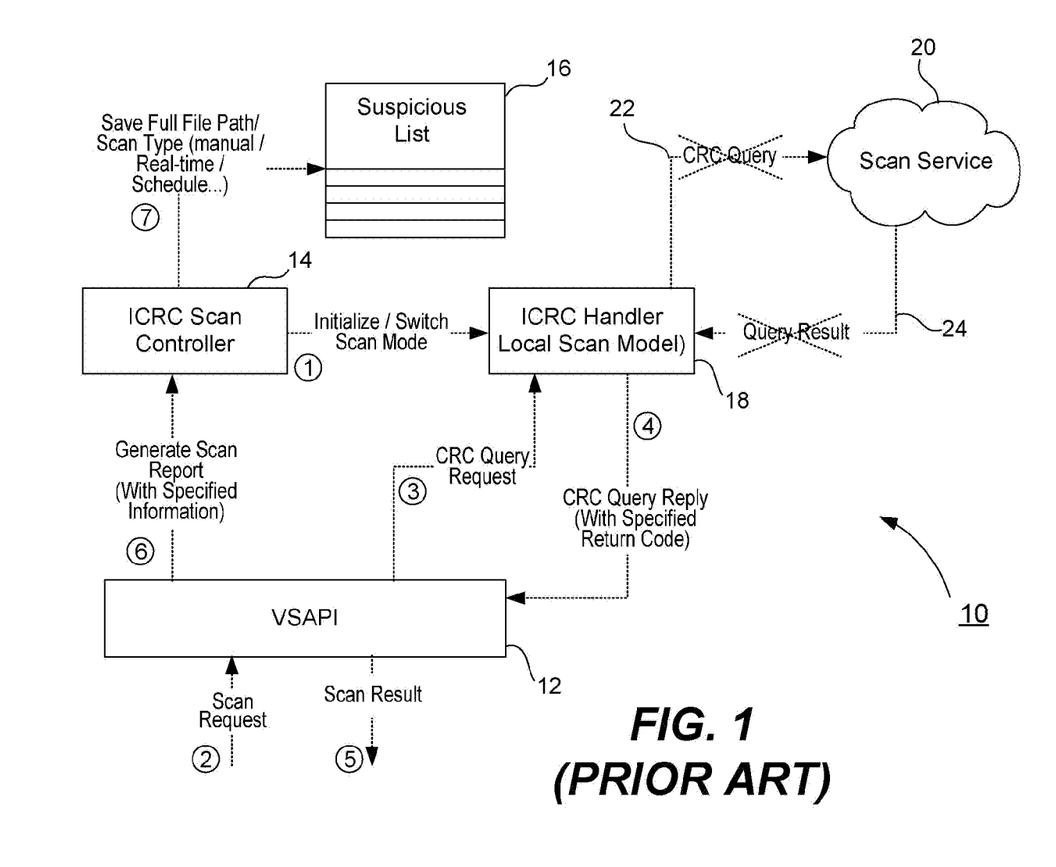
FIG. 1 a computing environment making use of an in-the-cloud scan service.
Figure 8A:
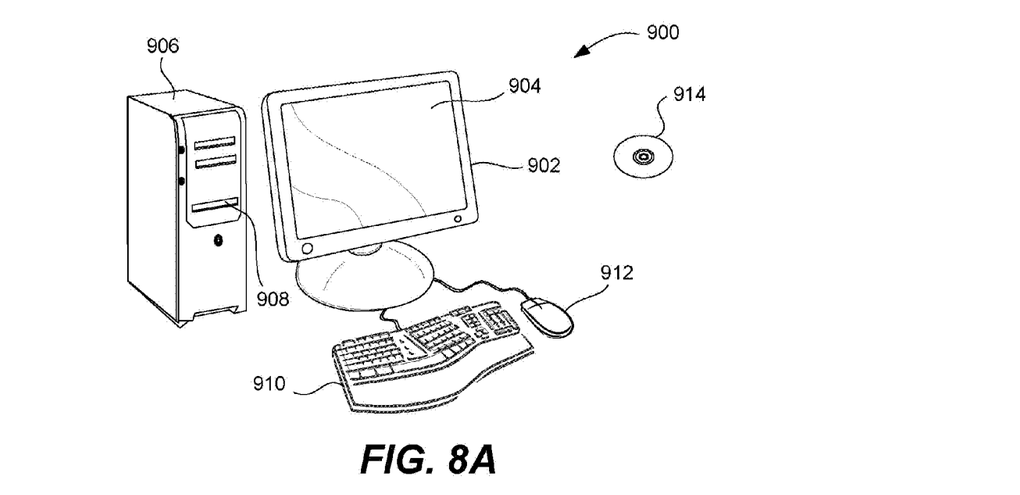
FIGS. 8A and 8B illustrate a computer system suitable for implementing embodiments of the present invention.
Figure 8B:
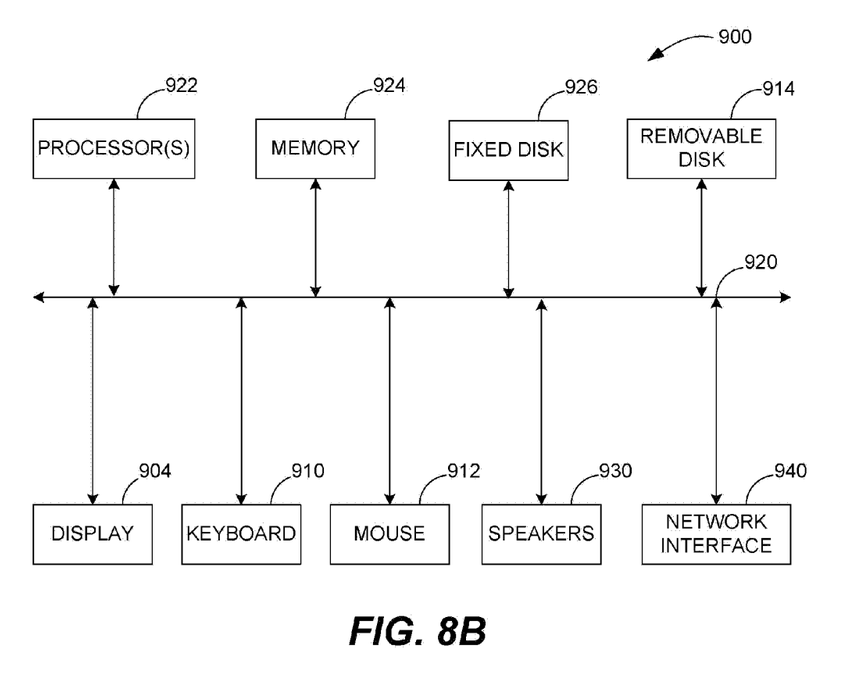

FIG. 1 illustrates a computing environment 10 making use of an in-the-cloud scan service 20. In general, a virus scan engine 12 (such as virus scanning API, or VSAPI) executes upon a user computer, such as the computer shown in FIGS. 9A and 9B. Also included upon the client computer is a scan controller 14 (which initializes scan mode at 1), a suspicious list 16 and a handler 18. When the scan engine receives a scan request 2 (initiated manually by the user or automatically by the computer) it calculates a CRC of a suspect file and sends a CRC query 3, 22 over the network to the cloud service 20. The CRC is compared against the pattern file located on the cloud server and the query result 24 is returned back over the network to the client computer and is processed at steps 4-7. Thus, this cloud-client file reputation (CCFR) service relies heavily upon communication over a network between the client computer and the scan service 20.

As mentioned above, there can be a very large network service recovery cost if the client computer is forced to disconnect from the service because of network congestion or because the scan server is busy (indicated by query 22 and result 24 being crossed out). The client computer typically uses the static method to communicate with the cloud service which means that the timeout value for a specific query is static, which cannot react to a real network traffic situation. In a one specific example, a CCFR BF update is affected by a lack of suitable bandwidth. A BF Update is type of pattern update event in which the client downloads the latest version from a scan server.

It can happen that many client computers perform a BF update at approximately the same time and are thus accessing the scan server over a network connection at the same time. The scan server does not consider whether the available bandwidth of the service is capable of supporting any specific client. Accordingly, if a client computer is sending a CRC query to the scan server at the same time, or may not be enough available bandwidth because of network congestion or because the scan server is busy. The client computer will then be forced to switch to an offline mode and will incur a large network service recovery cost. In the case of a client computer that is attempting to use the cloud-client file reputation service, this cost will include a reconnect time of about 3 minutes, rescanning the process, a drop in the client computer's performance, and the risk that the client computer will become infected in the meantime. Further, if the online connection is disconnected the scan engine 12 will enter off-line mode and all CRCs of scanned files will go into suspicious list 16 (even though they might be legitimate files).

Therefore, it is recognized that lack of suitable bandwidth for any of a variety of cloud services can be problematic and a solution is desired.

SUMMARY OF THE INVENTION

To achieve the foregoing, and in accordance with the purpose of the present invention, a bandwidth prediction mechanism is disclosed that calculates currently available bandwidth, computes a bandwidth moving average, predicts future bandwidth available, and provides a network status for action if necessary.

The present invention adds a prediction mechanism regarding available bandwidth to prevent disconnection from a cloud service, i.e., bandwidth is predicted and actions may be taken before a network failure occurs. Preferably, prediction of the available bandwidth is from the viewpoint of a client computer, which purpose is to evaluate whether that available capacity can meet the needs of the specific subscribing service the client has in mind.

The present invention provides many advantages. For one, the bandwidth predictor described herein may be used in any type of network where a client computer is communicating with a server computer, such as in a local area network, a wide area network or over the Internet. In other words, the server computer may be located within the same company as the client computer or may be located outside of the control of the company. Further, the invention helps prevent a client computer from being disconnected from a cloud service because of network congestion or busy servers, thus avoiding any network service recovery cost. Prediction of the available bandwidth from a client viewpoint can help that client evaluate whether the capacity exists for a specific subscription service. The invention also allows the capability to perform network bandwidth capacity management, including the prevention of network congestion, prevention of busy servers, load balancing, improved quality of service, and the inclusion of a smart bandwidth controller within a client computer.

The present invention also allows integration with any cloud service. For example, the client can feed back the determined bandwidth available to a cloud service, and then we can obtain the average round trip time (RTT) from a specific domain to obtain an adaptive timeout value. Currently a static timeout value of 3,000 is used which is disadvantageous because that value cannot react to a real network situation. Using the present invention, if the network is busy, we can dynamically adjust the timeout value; after that the service can adapt to the network situation.

The present invention is applicable to any type of cloud service. For example, the present invention is able to predict the available bandwidth (from the client's viewpoint) in order to evaluate whether that capacity is sufficient for the current service to which the client subscribes. Any subscribing service is applicable, such as a cloud-client file reputation (CCFR) service, or a pattern update event.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

As pointed out above, the present invention addresses the need to predict the available bandwidth from the client side in order to evaluate whether there is capacity for the client to engage in a particular subscribing service from a cloud service. Accurate prediction of available bandwidth avoids any network service recovery cost caused by a dropped connection due to network congestion or a busy cloud server. The recovery time needed after a network failure is longer than expected because it includes: a failure detection time once the failure occurs, a hold-off time once the failure has been detected, a fault notification time, a recovery operation time, and finally a traffic recovery time.

The present invention provides a bandwidth prediction mechanism—preferably located as a software agent module located on a client computer—that monitors available bandwidth of a network connection to a cloud service. In one embodiment, a software watcher agent located at a client computer evaluates a bandwidth request associated with a particular subscribing service and calculates an available bandwidth. The agent is able to predict the probability of an available bandwidth and report the result to a management server. The management server can then allow the subscription service or network connection to proceed, or may block a particular process or a particular user because of excessive bandwidth consumption. The management server thus can provide a service quality guarantee.

Figure 2:
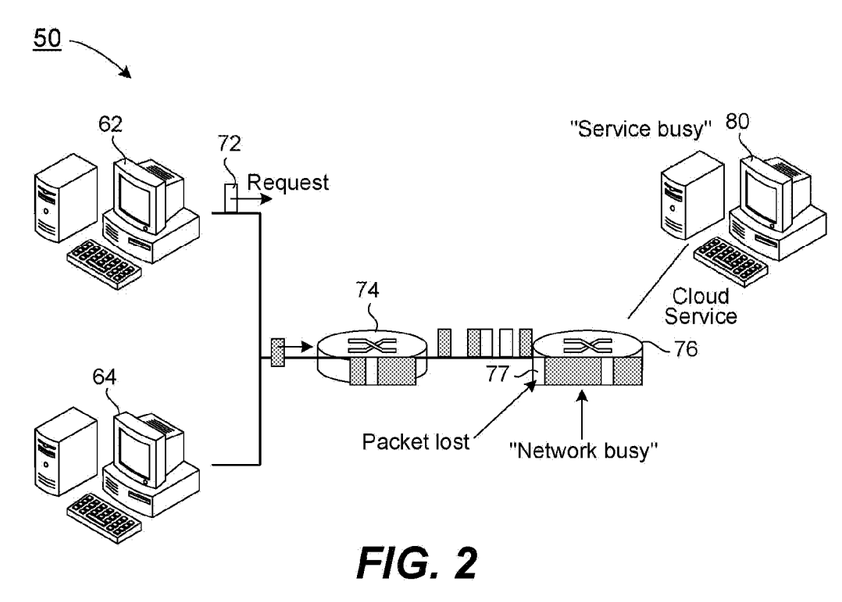
FIG. 2 illustrates a computing environment in which any number of client computers communicate over a network (such as the Internet) with a cloud server computer.

FIG. 2 illustrates a computing environment 50 in which any number of client computers communicate over a network (such as the Internet) with a cloud server computer 80. Computer 80 implements a particular cloud service to which the client computer wishes to subscribe, or is participating in. As part of that service, client 62 sends a particular request 72 (including a number of packets) over the network through routers or other computers 74 and 76. As will be appreciated, if there is network congestion or a package 77 is lost a "network busy" error may occur resulting in the connection with the computer 80 being dropped. Or, the connection may be dropped, delayed or unavailable if the computer 80 experiences a "service busy" situation.

Advantageously, the present invention implements a watcher agent within client computer 62 (and within computer 64 if desirable) in order to calculate, monitor and report on the available bandwidth. The below description describes how the available bandwidth is calculated and used. In one embodiment, a latency value is obtained for use in calculation of the available bandwidth.

Figure 3:
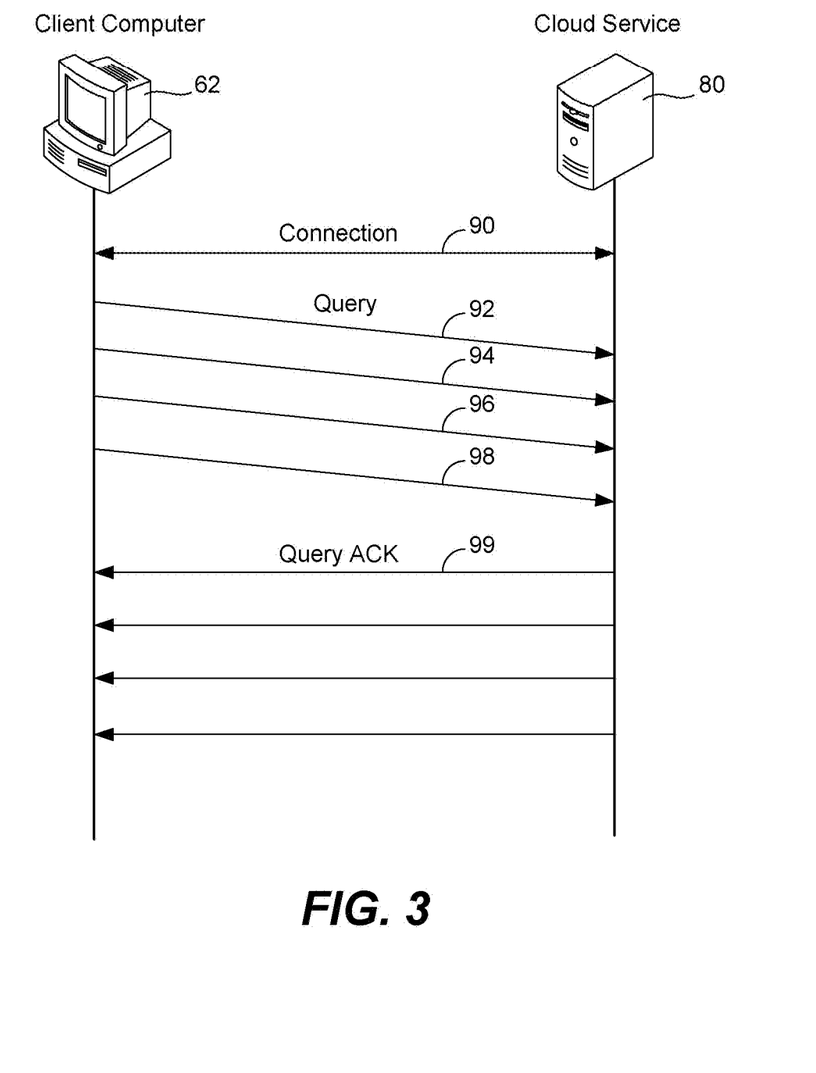
FIG. 3 illustrates how a latency value may be obtained for use in calculation of the available bandwidth.

FIG. 3 illustrates how a latency value may be obtained for use in calculation of the available bandwidth. Shown is a client computer 62, a computer server 80 and an established network connection 90. As shown, a query 92 results in a query acknowledgment 99. Any number of other queries 94-98 may also be sent resulting in corresponding query acknowledgments as shown. The queries and acknowledgments sent and received may be implemented using any suitable protocol over any suitable network connection. For example, the HTTP protocol may be used. Requests and responses implemented using the known socket functions may also be used such as using the WSASocket functions. As is known in the art, a packet sent from a sending entity is received at a receiving entity which then responds by sending back and acknowledgment that is received by the sending entity. Of course, it is possible that a sent packet will be lost in transmission, in which case the sending entity may need to resend the packet (typically after a suitable timeout value). In one embodiment, an iCRC Query is sent resulting in an iCRC Query Acknowledgment.

The latency may be determined using the results of the query and the query acknowledgment. The query times are recorded and depend upon the service being used. Both latency and RTT values are used. RTT is the TCP round-trip time, while XX_Latency is the duration counted from the sending of the packet to the receiving of the response, caused by sending a specific query.

Flow Diagram

Figure 4:
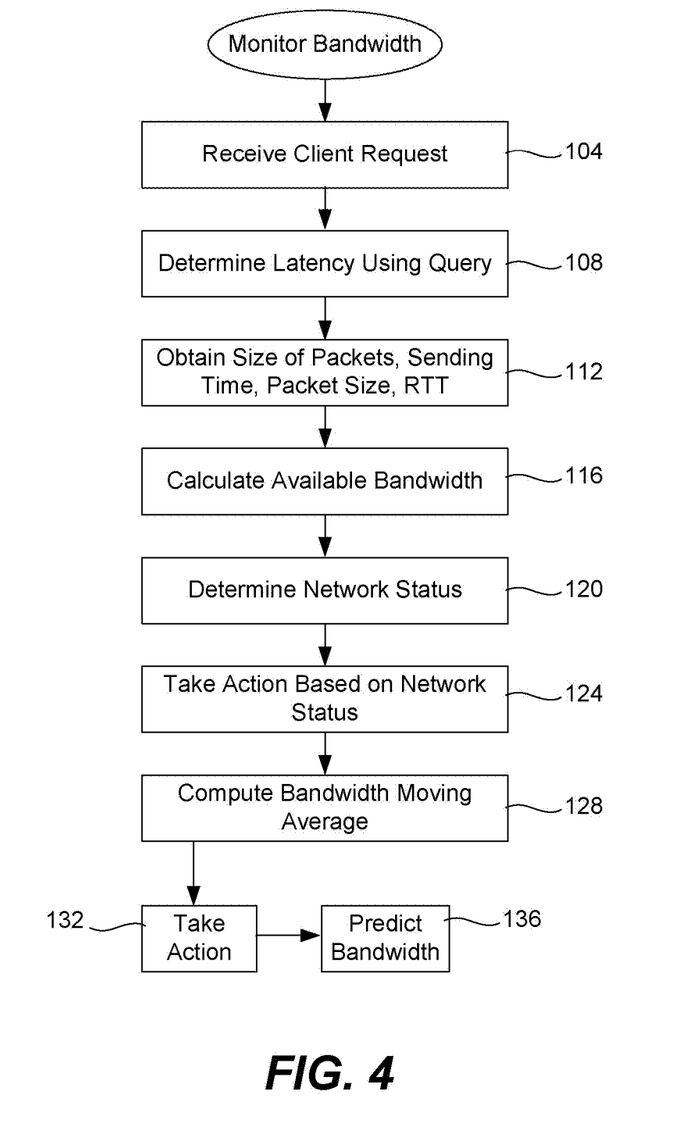
FIG. 4 is a flow diagram describing one embodiment by which available bandwidth is calculated and used.

FIG. 4 is a flow diagram describing one embodiment by which available bandwidth is calculated and used. In step 104 the watcher agent within client computer 62 receives a request from any suitable client software module (such as an antivirus application that needs CRC service) to calculate and predict the available bandwidth. Next, in step 108 we can determine the Latency by sending a request from the client to the server and then noting when the response arrives. Once the Latency value has been determined, the available bandwidth (BA) may be calculated using the below formula.

Next, in step 112 the values of variables used in the below formulas are obtained as follows. The below formula represents the TCP or UDP interval for sending a packet (or any request query) from client 62 to server 80. The variable O is the size of all packets sent in the request query, BA is the bandwidth available (to be determined), and "n" is the number of times that parts of a particular packet must be sent. The variable "O" is the total size of all packets sent in the request.

Generally, the TCP layer may split larger packets into many parts and then send these parts separately. Typically, packets greater than 1,480 bytes will be split into smaller parts. For smaller packets "n" will have a value of 1. For example, if a packet is split into two parts then "n" will have a value of 2. The third part of Formula (1) represents the situation in which a large packet must be split into parts and the time for these parts to be transmitted must be accounted for. S is the size of one packet, RTT is the TCP "round-trip time," and T1_Latency is the duration counted from the sending of the packet to the receiving of the response, caused by sending a specific query.

In step number 116 these variables are used in the below formulas to calculate the available bandwidth.

$$T1\_Latency = \frac{O}{BA} + 2RTT + \sum_{k=1}^{n}\left(RTT + \frac{S}{BA} - \frac{S}{BA}2^{k-1}\right)^{+} \quad \text{Formula (1)}$$

$$\sum_{k=1}^{n} 2^{k-1} = 2^n - 1 \quad \text{Formula (2)}$$

Because of Formula (2), we can rewrite Formula (1) as:

$$T1\_Latency = \frac{O}{BA} + 2RTT + n\left(RTT + \frac{S}{BA}\right) - (2^n - 1)\frac{S}{BA}$$

The first RTT value is the TCP connection time that includes the latency of the triple handshake; because this RTT is very small, we can thus remove it, and we can rewrite Formula (2) as:

$$T2\_Latency = \frac{O}{BA} + RTT + n\left(RTT + \frac{S}{BA}\right) - (2^n - 1)\frac{S}{BA}$$

We can then rewrite this formula to obtain BA, where BA is the bandwidth available in units of megabytes per second:

$$BA = \frac{O + n*S - (2^n - 1)*S}{T2\_Latency - RTT - (n*RTT)} \quad \text{Formula (3)}$$

Figure 5:
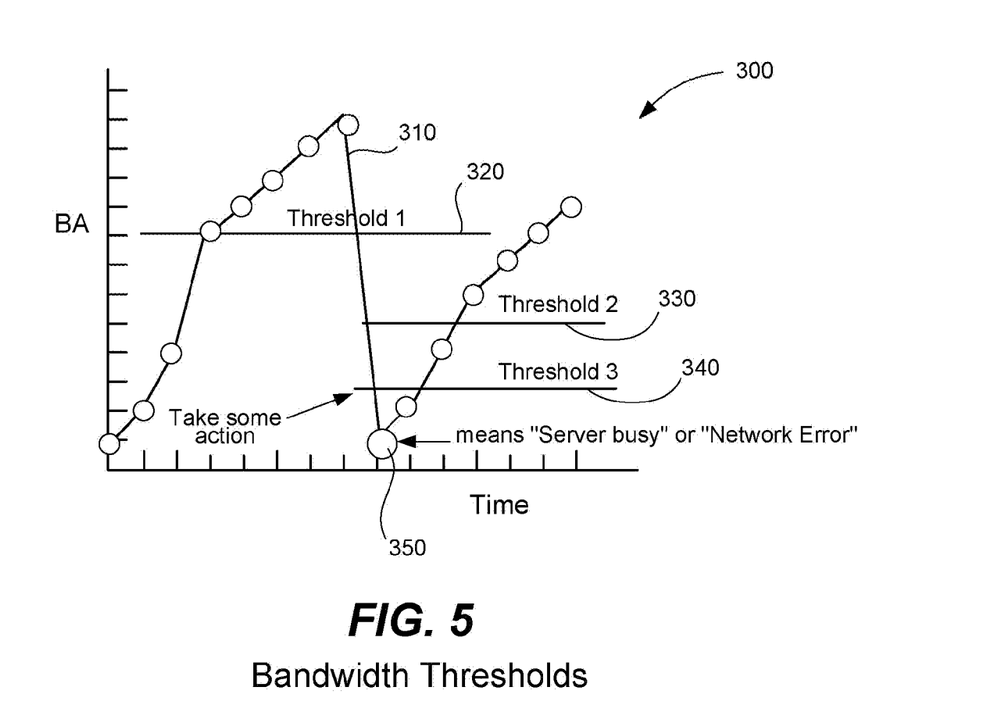
FIG. 5 illustrates a graph of bandwidth available over time for a particular computer server and threshold values.

In step 120 the network status may be determined as follows. The calculated bandwidth available may be compared to predefined thresholds to determine the likely network status. FIG. 5 illustrates a graph 300 of bandwidth available over time for a particular computer server and threshold values. Graphical line 310 illustrates how the bandwidth available may fluctuate up and down over time. Threshold values 320, 330 and 340 indicate particular values for the bandwidth available that indicate a particular network status. These threshold values are predefined and may be determined using a particular technique such as through training, empirical analysis, etc. They may also be adjusted from time to time. For example, using this graph a network status may then be defined as follows: if BA>threshold 1 then the network has "excellent status" which implies a great scan performance; if BA>threshold 2 and BA<threshold 1 then the network has "good status;" if BA>threshold 3 and BA<threshold 2 then the network has "ordinary status;" and if BA<threshold 3 then the network has "poor status." "Excellent" status means that the cloud service performance (such as scan performance) will be excellent. Poor status means that the network has low available bandwidth and it is recommended not to perform an active update (AU) procedure (for example, to perform a pattern update for an anti-virus product) or that the cloud server is busy. "Good" and "Ordinary" status are somewhere in between.

Point 350 in FIG. 5 shows a bandwidth available so low (or nonexistent) that either the computer server is busy or there has been a network error and the cloud service is thus unavailable at that time. Once the bandwidth available drops below a certain value, action may be taken as shown in step 124. For example, threshold 3 may be may be designated as a lower threshold at which taking a particular action is necessary in order to either access the cloud service or be able to continue using it. Once the bandwidth available drops below threshold 3 an action may be taken such as forking the CRC query or waiting a specific length if time in order to reduce the server's loading.

An example for determining network status follows. Assume that the three thresholds of FIG. 5 have been predefined as follows: threshold 1 is at 400 MB, threshold 2 is at 200 MB, and threshold 3 is at 100 MB. The watcher agent in the client computer now sends a request to the cloud server 80, in this case, an iCRC Query having a packet size of 64 Kbytes. Because of the small size of this packet there is no need for the packet to be segmented or split into parts. Assume that the total response time is 100 ms (including RTT, connection time and acknowledgment time); in other words, the denominator of Formula (3) is 100 ms. The numerator of Formula (3) then becomes 64 and the result is 64/0.001 or 640 MB/s. Thus, the calculated bandwidth available at this point in time is 640 MB per second.

The thresholds may also be adjusted to adapt to the customer's environment. At first, the various thresholds may be determined by data training. In actual use, though, the historical bandwidth data may be used to adjust the thresholds. For example, based upon one hour of historical available bandwidth data, it is determined that the average BA is 350 MB per second, the average of the top 10 BA is 600 MB per second, and that the average of the top 10 lowest BA is 50 MB per second. Therefore, the three thresholds may be adjusted dynamically to be set as follows: threshold 1 is set to 600 MB, threshold 2 is set to 350 MB, and threshold 3 is set to 100 MB. In a given situation, then, we can calculate the BA, compare it to these adjusted thresholds and take action as necessary.

In addition to using the calculated bandwidth available to determine a network status, historical bandwidth data may also be used to predict future available bandwidth. To that end, in step 128 a bandwidth moving average is computed.

Figure 6:
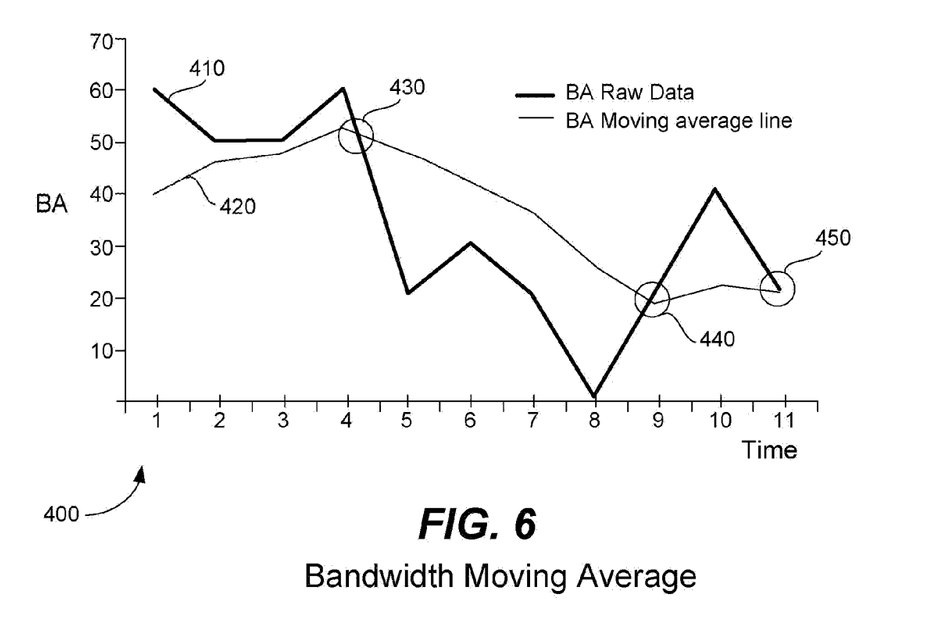
FIG. 6 is a graph illustrating raw bandwidth data plotted in contrast to a bandwidth moving average over time.

FIG. 6 is a graph 400 illustrating raw bandwidth data plotted in contrast to a bandwidth moving average over time. As shown, line 410 is the bandwidth available raw data calculated over time using the above formulas. Line 420 is a computed bandwidth available moving average.

The bandwidth available moving average may be computed using different techniques. In one embodiment, the moving average is computed by taking the average of raw bandwidth data values over the last N values. For example, a 5-day moving average is computed by adding together the bandwidth available values for the previous five days (assuming that bandwidth available is calculated each day or a representative value for each day is used) and then dividing the total by 5. If this calculation is performed every day (using values from the previous five days) then a moving average graph may be obtained as shown in FIG. 6. Of course, moving averages based upon different time periods (such as minutes, hours, weeks, etc.) may also be computed.

As shown in FIG. 6, the moving average line 420 smoothes out the spikes shown in the raw data line 410 and means that threshold values are less likely to be crossed by the moving average line in contrast to the bandwidth available raw data line 410. Points 430, 440 and 450 where the moving average line crosses the raw data line are potential action points because a crossover indicates that either the actual bandwidth available is dropping sharply as compared to the moving average (points 430 and 450), or, the bandwidth available is rising sharply (point 440). In these situations, the threshold is where the moving average line crosses the raw data line.

Due to the inherent characteristic of the delayed calculation of the moving average line, its value may always lag behind the raw data values. For that reason, the crossing points 430 and 440 can be obtained regardless of whether the trend of the raw data is increasing or decreasing. Once the slope is calculated at points 430 or 440, the invention can predict the future slope after these points. For example, the invention determines that the cross point occurs at 430, that the trend of the moving average line is decreasing, and that the slope at 430 is approximately −30 degrees. Because this indicates a sharp negative trend, action can be taken at this time such as forking the CRC query or waiting a specific length of time in order to reduce the server's loading.

Action may be taken if the moving average is exactly the same as the bandwidth available at a particular time (i.e., a crossover point), or, action may be taken if the moving average is nearly the same as the bandwidth available at a particular time. In other words, if the moving average is within 10 MB/s (for example) of the actual bandwidth available then action will be taken. This range may also be determined by data training. In step 132 a potential action (such as forking the CRC query or waiting a specific length of time to reduce the server's loading) may be taken in response to either sharply decreasing available bandwidth or sharply increasing available bandwidth.

In addition, in step 136 future available bandwidth may be predicted using the slope of the available bandwidth line 410. Using the assumption that time 4 is a particular day and time 5 is the next day, one may predict future bandwidth on the next day. For example, at time 4 the bandwidth available is approximately 60 MB but the slope of the line 410 is negative and is decreasing sharply. Thus, at any point in time from day 4 onward, one may use the slope of the line coupled with the starting point of approximately 60 MB to predict that on day 5 that the bandwidth available will be approximately 20 MB. Such a prediction using the slope of the line may be performed at any time, including a situation such as shown at times 8-10 when the bandwidth available is increasing.

Integration Example

Figure 7:
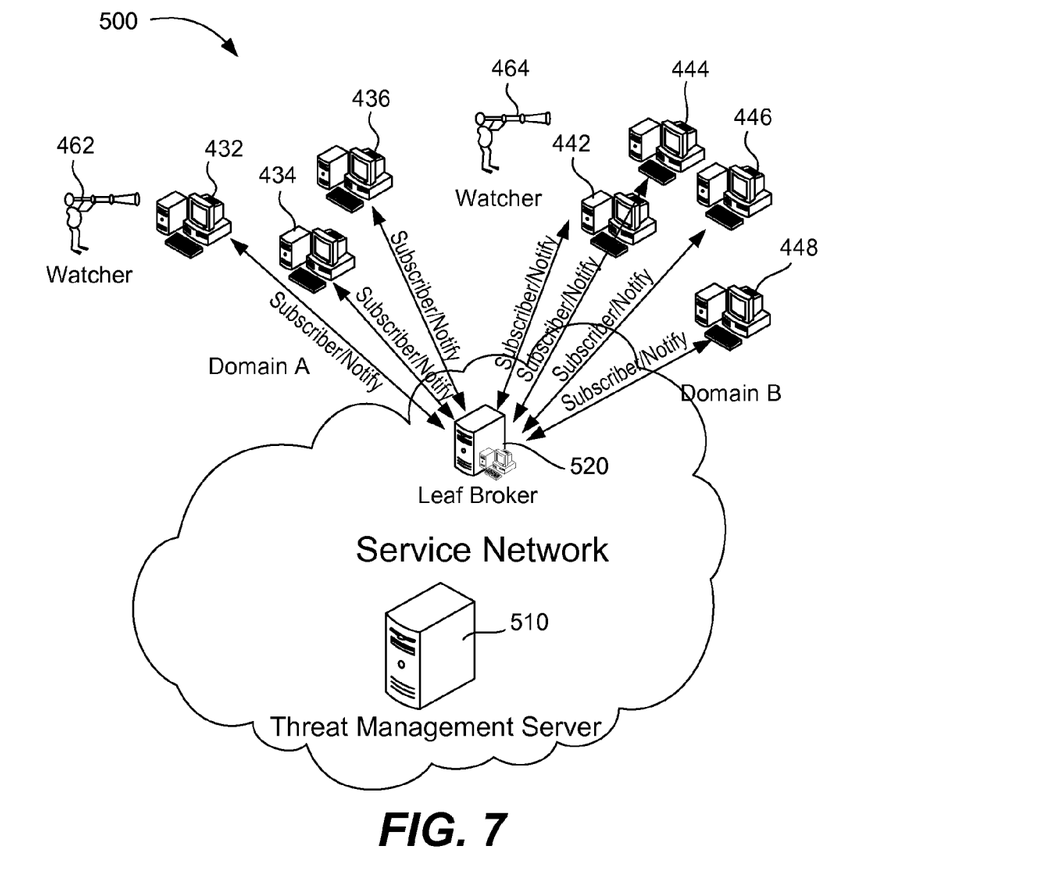
FIG. 7 illustrates an integration example.

FIG. 7 is an integration example. Shown available over the Internet is a threat management server 410 linked to a leaf broker computer server 420. Any number of client computers 432-436 represent a domain A (such as a local network within a corporation) and any number of client computers 442-448 represents a domain B (such as any self-contained entity). Each of these client computers is arranged to subscribe to a cloud service via leaf broker 420 and each client computer includes watcher agent software 462 or 464 in order to calculate and predict bandwidth available as described above. Alternatively, each domain only requires a single watcher agent to predict bandwidth available and to relay that result to any of the client computers within its domain.

As described above, watcher agent 462 is able to monitor bandwidth available via leaf broker 420 and advise its client computers 432-436. The watcher agent, upon request from a client computer, may perform this calculation and advise any of its client computers that it is not advisable to initiate a request for a cloud service because the bandwidth available is not large enough at this time.

In an alternative embodiment, the threat management server 410 is able to calculate the average bandwidth usage of both domain A and domain B. If the bandwidth used in a particular domain is unusual (i.e., too large) then the management server may take steps to block a particular domain (or a particular client computer) from accessing the cloud service.

Computer System Embodiment

FIGS. 8A and 8B illustrate a computer system 900 suitable for implementing embodiments of the present invention. FIG. 8A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 8B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of predicting available bandwidth between a client computer and a remote computer server, said method comprising:
   receiving, at said client computer, a bandwidth request associated with a cloud service of said remote computer server to which said client computer subscribes, and a request to predict available bandwidth on a network between said client computer and said remote computer server at a future time;
   calculating a plurality of available bandwidth values between said client computer and said computer server over said network using a latency value that is determined by sending a query from said client computer to said computer server and noting when an acknowledgement to said query arrives at said client computer, said plurality of available bandwidth values beginning at an initial time and extending to a past time;
   calculating a slope of said plurality of available bandwidth values, said slope being positive and indicating that said predicted available bandwidth is increasing;
   determining a predicted available bandwidth at said future time using one of said plurality of available bandwidth values and said calculated slope;
   returning said predicted available bandwidth to a software application of said client computer;
   comparing said predicted available bandwidth to a predefined bandwidth threshold to determine whether said client computer may engage in said cloud service to which said client computer subscribes;
   allowing said client computer to proceed with said cloud service of said remote computer server when it is determined that said predicted available bandwidth is greater than said predefined bandwidth threshold; and
   blocking said client computer from proceeding with said cloud service when it is determined that said predicted available bandwidth is less than said predefined bandwidth threshold.

2. A method as recited in claim 1 wherein said plurality of available bandwidth values, when plotted against time, form a straight line.

3. A method as recited in claim 1, further comprising:
   providing said predicted bandwidth to a software application on said client computer for use in decision making.

4. A method as recited in claim 1 wherein said plurality of available bandwidth values are retrieved from a computer memory.

5. The method as recited in claim 1 further comprising:
   calculating each of said available bandwidth values using the total size of all packets sent in a request between said client computer and said remote computer server, the size of one of said packets, and the round-trip time.

6. The method as recited in claim 1 further comprising:
   computing an average of said plurality of available bandwidth values;
   calculating said slope using said average; and
   determining said predicted available bandwidth at said future time using said average and said calculated slope.

7. The method as recited in claim 6 further comprising:
   calculating a moving average using said plurality of available bandwidth values;
   determining said predicted available bandwidth at said future time using said moving average.

8. The method as recited in claim 1 further comprising:
   calculating a moving average available bandwidth using said plurality of available bandwidth values;
   determining said predicted available bandwidth at said future time is within 10 MB of said moving average available bandwidth; and
   taking an action based upon said determining.

9. The method as recited in claim 8 wherein said determining indicates decreasing available bandwidth and said taking an action includes waiting a specific length of time before sending a next query from said client computer to said remote computer server.

* * * * *